(12) United States Patent
Shinchi et al.

(10) Patent No.: US 12,506,293 B2
(45) Date of Patent: Dec. 23, 2025

(54) CONNECTOR AND CONTINUITY TEST DEVICE

(71) Applicant: YAZAKI CORPORATION, Tokyo (JP)

(72) Inventors: Akira Shinchi, Makinohara (JP); Takashi Matsunaga, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 327 days.

(21) Appl. No.: 18/491,728

(22) Filed: Oct. 20, 2023

(65) Prior Publication Data
US 2024/0154349 A1    May 9, 2024

(30) Foreign Application Priority Data

Nov. 9, 2022    (JP) .................................. 2022-179764

(51) Int. Cl.
*H01R 13/46*    (2006.01)
*G01R 31/69*    (2020.01)

(52) U.S. Cl.
CPC ............. *H01R 13/46* (2013.01); *G01R 31/69* (2020.01)

(58) Field of Classification Search
CPC ...... H01R 13/46; H01R 13/629; H01R 12/91; G01R 31/69; G01R 31/67; G01R 31/54; G01R 31/55
USPC ......................................................... 439/625
See application file for complete search history.

(56) References Cited

U.S. PATENT DOCUMENTS

| | | | | | |
|---|---|---|---|---|---|
| 4,580,861 | A * | 4/1986 | Kaley | ................. | H01R 13/514 439/594 |
| 5,628,649 | A * | 5/1997 | Yagi | ................... | H01R 13/6272 439/354 |
| 7,179,135 | B2 * | 2/2007 | Osada | ................ | H01R 13/4365 439/752 |
| 9,039,458 | B2 * | 5/2015 | Tsuchiya | ............ | H01R 13/4365 439/701 |
| 10,367,310 | B2 * | 7/2019 | Zhu | ........................ | H01R 13/50 |
| 10,978,827 | B2 * | 4/2021 | Ehrman | ............ | H01R 13/6271 |
| 2001/0046803 | A1 * | 11/2001 | Kodama | ........... | H01R 13/6273 439/357 |

(Continued)

FOREIGN PATENT DOCUMENTS

| | | |
|---|---|---|
| JP | H04-55765 U | 5/1992 |
| JP | H09-274982 A | 10/1997 |
| JP | 2022-23658 A | 2/2022 |

*Primary Examiner* — Harshad C Patel
(74) *Attorney, Agent, or Firm* — KENEALY VAIDYA LLP

(57) ABSTRACT

The present disclosure relates to a connector and a continuity test device. The connector includes a connector housing having a block portion being provided with a terminal accommodating chamber, and a front holder insertion space being adjacent to the block portion for inserting a front holder that detects terminal half-insertion from a front side. The connector housing is formed with a groove for detecting erroneous fitting into a continuity test device. The groove for detecting erroneous fitting is fitted with a projection provided on the front holder when the front holder is inserted into the front holder insertion space. The groove receives a convex portion provided on a fitting port of the continuity test device when the connector housing is fitted into the fitting port of a continuity test device for a connector without the front holder.

3 Claims, 5 Drawing Sheets

(56) References Cited

U.S. PATENT DOCUMENTS

2002/0168895 A1* 11/2002 Suzuki .............. H01R 13/4365
439/752
2015/0372419 A1* 12/2015 Toyoda ................ H01R 13/193
439/345

* cited by examiner

1

CONNECTOR AND CONTINUITY TEST DEVICE

CROSS-REFERENCE TO RELATED APPLICATIONS

This application is based on and claims priority under 35 USC 119 from Japanese Patent Application No. 2022-179764 filed on Nov. 9, 2022, the contents of which are incorporated herein by reference.

TECHNICAL FIELD

The present disclosure relates to a connector and a continuity test device.

BACKGROUND ART

A connector used for a wire harness of an automobile or the like mainly includes a connector housing and terminals. Examples of such a connector include a connector including a waterproof packing and a connector including a front holder. A front holder is a component that detects half-insertion of terminals by being inserted into a connector housing from a front side after the terminals are assembled into the connector housing and that further increases a locking force for the terminals as disclosed, for example, in JP2022-023658A.

A front holder is generally inserted from a temporary locking position to a final locking position. When terminals are in a half-inserted state, the front holder cannot be inserted from the temporary locking position to the final locking position, whereby the half-insertion of the terminals is detected.

To reduce component costs, a connector housing to which a front holder can be attached can be used as a connector even in a state in which no front holder is attached. In this way, when the connector housing is common to both a connector to which a front holder is attached and a connector to which no front holder is attached, costs of a metal mold when manufacturing the connector housing can be significantly reduced. Further, there is an advantage that the connector housing can be common to a counterpart connector. In this case, detection of half-insertion of terminals of a connector without a front holder is compensated by providing a terminal half-insertion detector in a continuity test device (continuity check machine) at a commercialization stage of a wire harness.

Examples of the continuity test device include a continuity test device dedicated to a connector with a front holder and a continuity test device dedicated to a connector without a front holder, and continuity is tested with a continuity test device dedicated to a corresponding one of a connector with a front holder and a connector without a front holder.

However, at the commercialization stage of a wire harness, a connector with a front holder, instead of a connector without a front holder, may be erroneously attached to a continuity test device dedicated to a connector without a front holder. In this case, a half-terminal insertion detector of the continuity test device interferes with the front holder and damages the front holder, which may require replacement of the connector. On the other hand, a connector without a front holder, instead of a connector with a front holder, may be erroneously attached to a continuity test device dedicated to a connector with a front holder. In this case, continuity cannot be tested correctly due to absence of a front holder.

The present disclosure provides a connector, in which a wrong connector cannot be attached to a continuity test device, and a continuity test device.

In order to achieve the above object, a connector and a continuity test device according to the present disclosure have the following features.

SUMMARY OF INVENTION

The present disclosure provides a connector includes a connector housing including a block portion being provided with a terminal accommodating chamber, and a front holder insertion space being adjacent to the block portion for inserting a front holder that detects terminal half-insertion from a front side. The connector housing is formed with, from a front end toward a rear side on a peripheral wall, a groove for detecting erroneous fitting into a continuity test device. The groove for detecting erroneous fitting is configured to be fitted with a projection provided on the front holder when the front holder is inserted into the front holder insertion space. The groove is configured to receive a convex portion provided on a fitting port of the continuity test device when the connector housing is fitted into the fitting port of a continuity test device for a connector without the front holder.

The present disclosure provides a continuity test device that tests continuity of the above connector in which no front holder is attached to the connector housing, the continuity test device including a fitting port into which the connector housing is configured to be fitted, and a convex portion provided on the fitting port. When the connector housing without the front holder is fitted into the fitting port, the convex portion is configured to be received by the groove for detecting erroneous fitting so that the connector housing is fitted into the continuity test device. When the connector housing with the front holder is fitted, the convex portion is configured to come into contact with the projection of the front holder that blocks the groove so that the connector housing is blocked to be fitted into the continuity test device.

The present disclosure provides a continuity test device that tests continuity of the above connector in which the front holder is attached to the connector housing, the continuity test device including a fitting port into which the connector housing is configured to be fitted, and a front holder detector provided on a back wall of the fitting port. When the connector housing with the front holder is fitted into the fitting port, the front holder detector is configured to detect presence of the front holder. When the connector housing without the front holder is fitted, the front holder detector is configured to detect absence of the front holder.

The present disclosure is briefly described above. Details of the present disclosure can be clarified by reading modes for carrying out the disclosure (hereinafter, referred to as "embodiments") described below with reference to the accompanying drawings.

DESCRIPTION OF EMBODIMENTS

A specific embodiment of the present disclosure will be described below with reference to the drawings.

Figure 1:
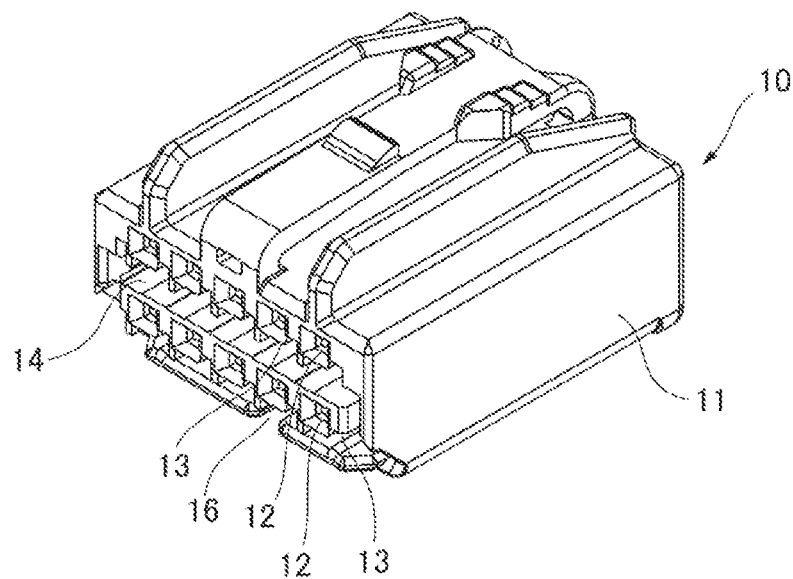
FIG. 1 is a perspective view of a connector without a front holder as viewed from an obliquely front upper side according to an embodiment of the present disclosure.
Figure 2:
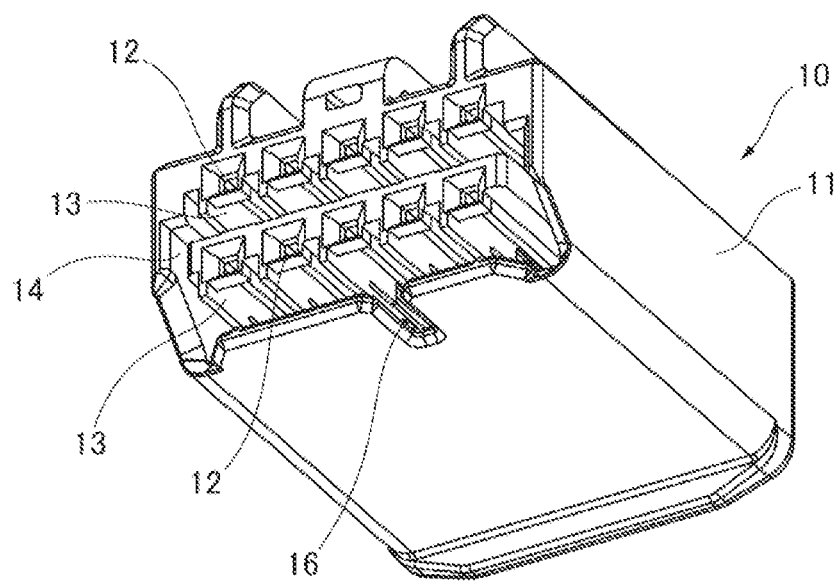
FIG. 2 is a perspective view of the connector in FIG. 1 as viewed from an obliquely front lower side.
Figure 3:
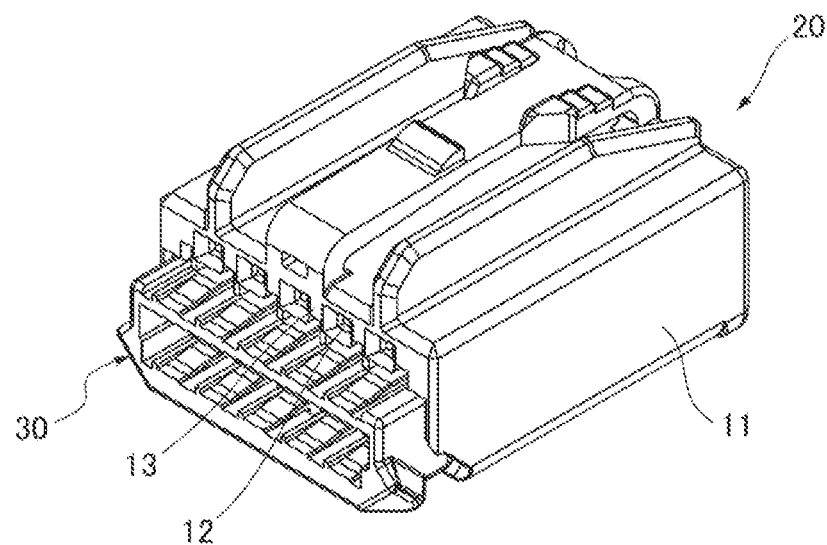
FIG. 3 is a perspective view of a connector with a front holder as viewed from an obliquely front upper side in a state in which the front holder of the connector is temporarily locked according to the embodiment of the present disclosure.
Figure 4:
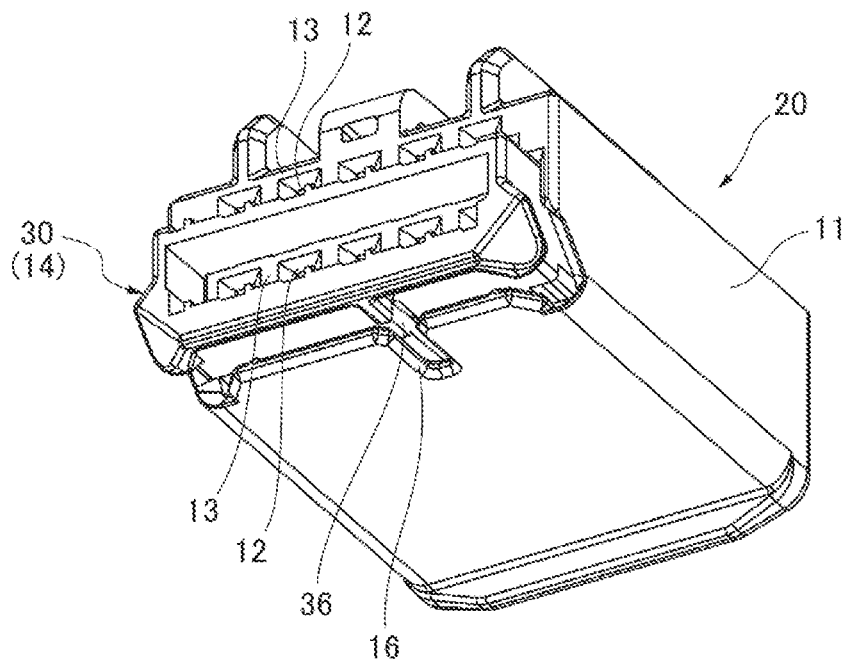
FIG. 4 is a perspective view of the connector in FIG. 3 as viewed from an obliquely front lower side.
Figure 5:
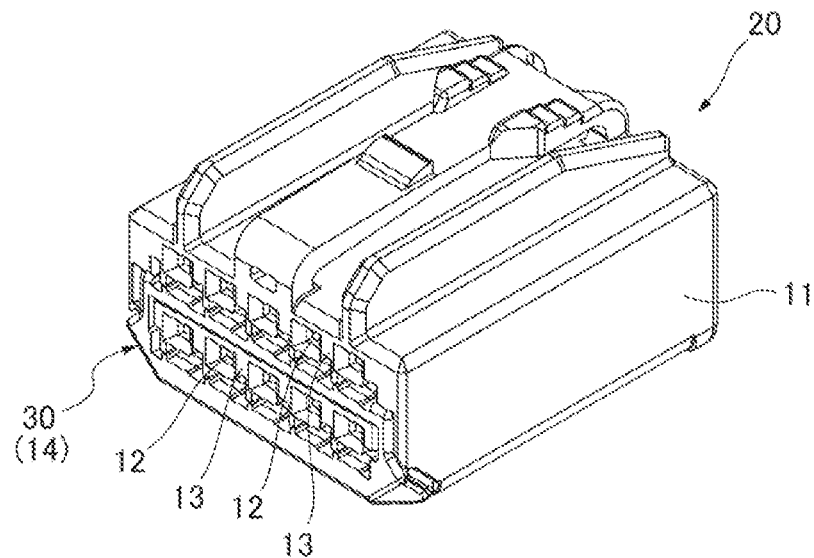
FIG. 5 is a perspective view of the connector with a front holder as viewed from the obliquely front upper side in a state in which the front holder of the connector is finally locked according to the embodiment of the present disclosure.
Figure 6:
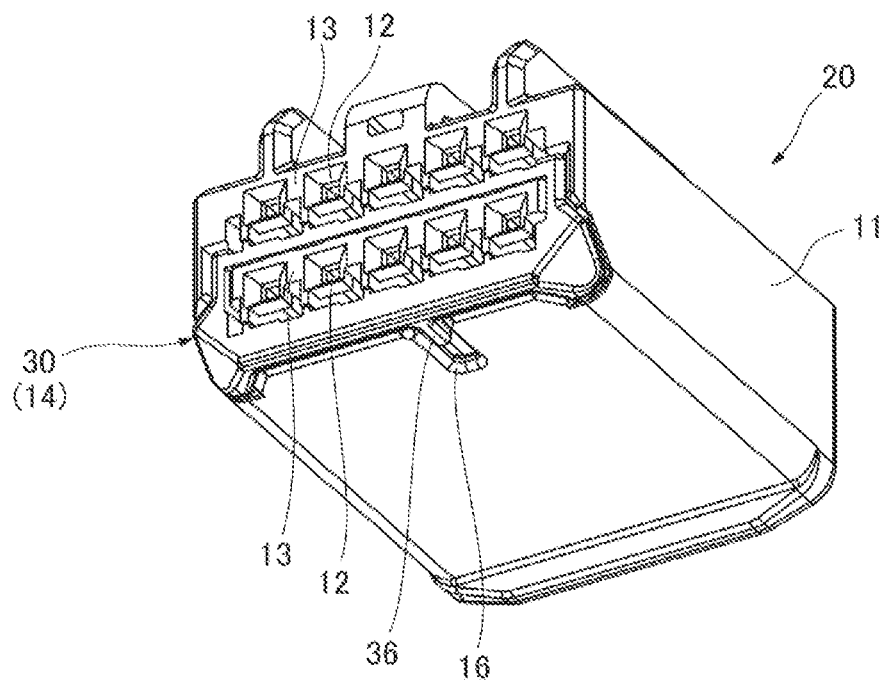
FIG. 6 is a perspective view of the connector in FIG. 5 as viewed from the obliquely front lower side.

FIGS. 1 to 6 show connectors according to the embodiment of the present disclosure. FIGS. 1 and 2 show a configuration of a connector without a front holder. FIGS. 3 to 6 show a configuration of a connector with a front holder. FIGS. 3 and 4 show a state in which a front holder is in a temporary locking position. FIGS. 5 and 6 show a state in which the front holder is inserted from a temporary locking position to a final locking position.

Two types of connectors 10, 20 have the same configuration except presence and absence of a front holder 30. As shown in FIGS. 1 to 6, the connector 10 without a front holder and the connector 20 with a front holder each include a connector housing 11 common to both types of connectors 10, 20.

The connector housing 11 has a block portion 13 provided with terminal accommodating chambers 12 (substituted by insertion holes for counterpart male terminals at front ends of the terminal accommodating chambers), and a front holder insertion space 14 for inserting the front holder 30 that detects half-insertion of terminals from a front side. The front holder insertion space 14 is adjacent to the block portion 13. As shown in FIGS. 1 and 2, the connector housing 11 is formed with, from a front end toward a rear side in a bottom peripheral wall, a groove 16 for detecting erroneous fitting into a continuity test device.

As shown in FIGS. 3 to 6, when the front holder 30 is inserted into the front holder insertion space 14, the groove 16 for detecting erroneous fitting is fitted with and blocked by a projection 36 provided on the front holder 30.

Figure 7:
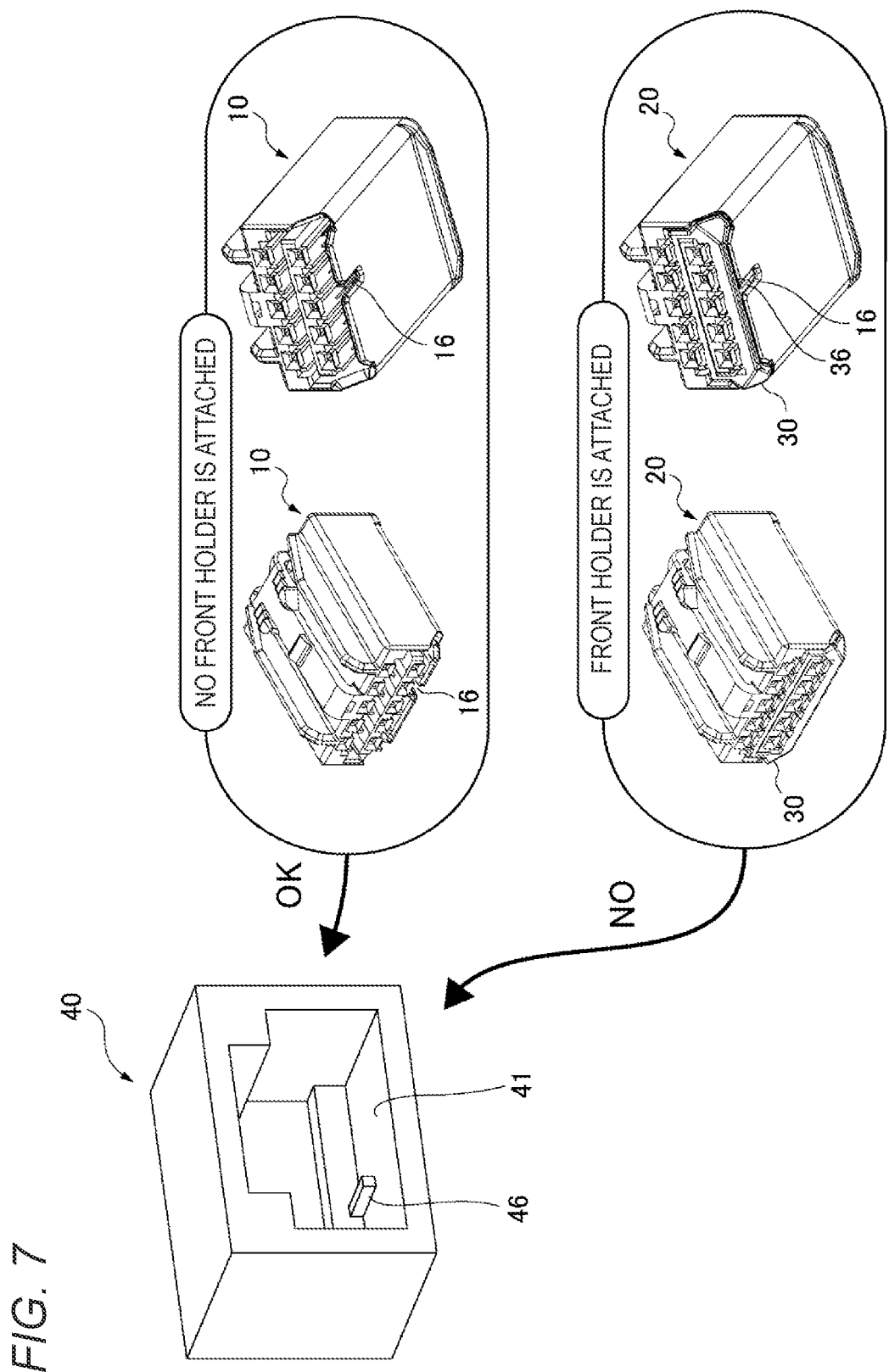
FIG. 7 shows a difference in compatibility between a continuity test device dedicated to a connector without a front holder and a connector without a front holder (F/H) and between the continuity test device dedicated to a connector without a front holder and a connector with a front holder (F/H)
Figure 8:
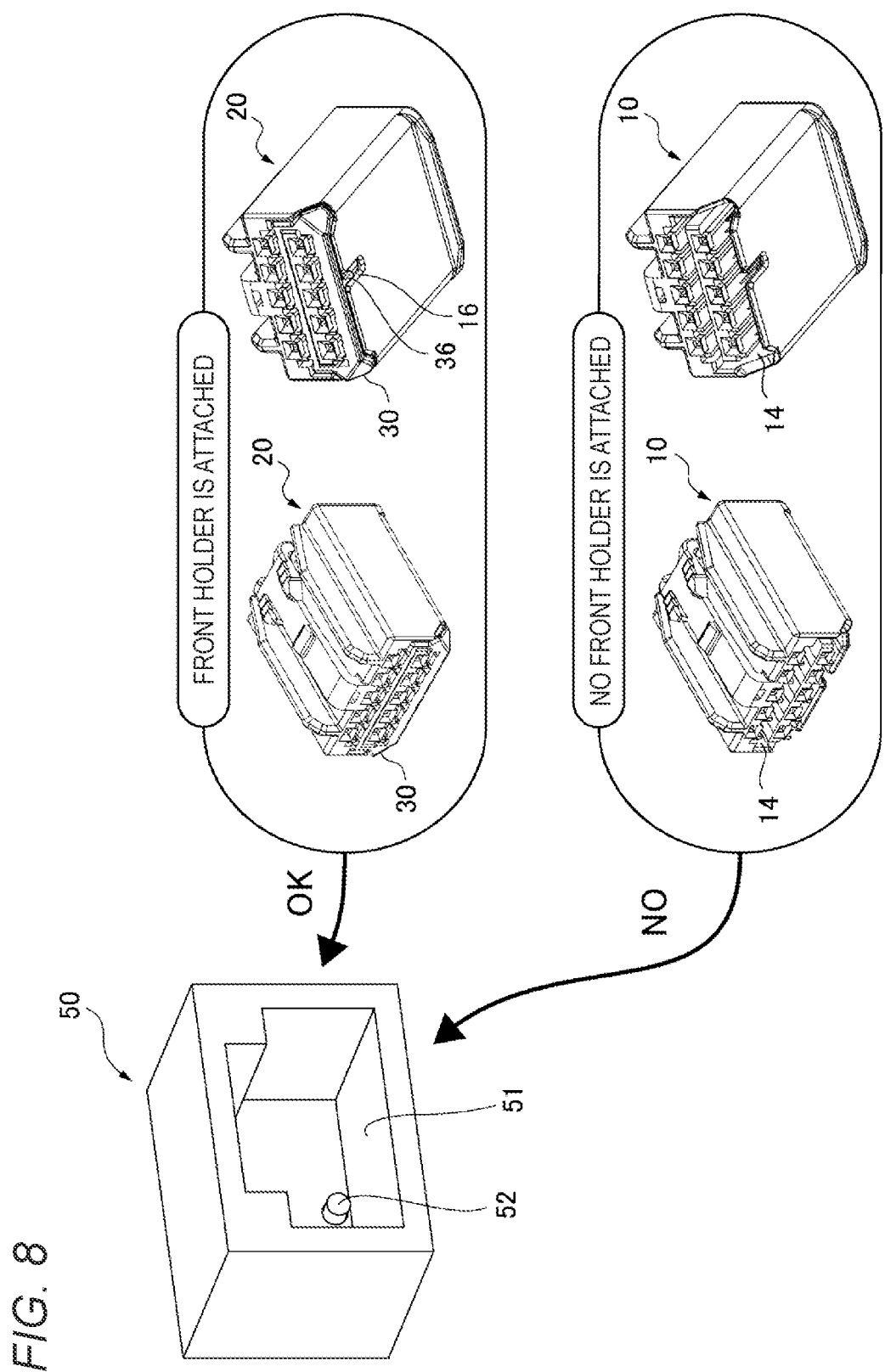
FIG. 8 shows a difference in compatibility between a continuity test device dedicated to a connector with a front holder and a connector with a front holder (F/H) and between the continuity test device dedicated to a connector with a front holder and a connector without a front holder (F/H).

FIG. 7 shows a difference in compatibility between a continuity test device 40 dedicated to the connector 10 without a front holder and the connector 10 without a front holder and between the continuity test device 40 and the connector 20 with a front holder. FIG. 8 shows a difference in compatibility between a continuity test device 50 dedicated to the connector 20 with a front holder and the connector 20 with a front holder and between the continuity test device 50 and the connector 10 without a front holder.

As shown in FIG. 7, when the connector housing 11 is fitted into a fitting port 41 of the continuity test device 40 dedicated to the connector 10 without a front holder, the groove 16 for detecting erroneous fitting in the connector housing 11 receives a convex portion 46 provided in the fitting port 41 of the continuity test device 40.

When assembling the connector 20 with a front holder, first, the front holder 30 is inserted to a temporary locking position of the front holder insertion space 14 of the connector housing 11 and temporarily locked (state in FIGS. 3 and 4). Next, terminals are inserted into the terminal accommodating chambers of the connector housing 11 from a rear side. The terminals inserted to proper positions are retained and locked by lances provided in respective terminal accommodating chambers. Next, the front holder 30 is further inserted to a final locking position. When the front holder 30 cannot be inserted to the final locking position, half-insertion of the terminals is detected. When the terminals are not half-inserted, the front holder 30 is inserted to the final locking position and finally locked, thereby restraining deflection of the lances and increasing a locking force for the terminals.

When assembling the connector 10 without a front holder, terminals are inserted into the respective terminal accommodating chambers 12 of the connector housing 11 from a rear side in a state in which no front holder 30 is inserted, and the assembly is completed by locking the terminals with lances.

Next, the dedicated continuity test devices 40, 50 will be briefly described.

The continuity test device 40 shown in FIG. 7 is a continuity test device dedicated to the connector 10 without a front holder when no front holder 30 is attached to the connector housing 11. In the continuity test device 40, the convex portion 46 is provided on an inner bottom surface of the fitting port 41 into which the connector housing 11 is fitted during a test.

When the connector 10 without a front holder is fitted into the fitting port 41, the convex portion 46 is received by the opened groove 16 for detecting erroneous fitting. Accordingly, the connector 10 can be fitted immediately, and continuity of the connector 10 is tested. When the connector 20 with a front holder is erroneously fitted, the projection 36 of the front holder 30 that blocks the groove 16 for detecting erroneous fitting interferes with the convex portion 46 of the continuity test device 40. The connector 20 cannot be fitted (the connector 20 is not attached to the continuity test device 40), and accordingly erroneous fitting is diagnosed and no more continuity would be tested.

The continuity test device 50 shown in FIG. 8 is a continuity test device dedicated to the connector 20 with a front holder when the front holder 30 is attached to the connector housing 11. The continuity test device 50 includes a front holder detector 52 on a back wall of a fitting port 51 to which the connector housing 11 is fitted during a test.

The front holder detector 52 detects presence of the front holder 30 when the connector 20 with a front holder is fitted into the fitting port 51. When the connector 10 without a front holder is erroneously fitted, absence of the front holder 30 is detected. Accordingly, an abnormality of a component lack is diagnosed and a continuity test is stopped.

In this way, the connector 10 without a front holder and the connector 20 with a front holder can be prevented from being erroneously fitted to the continuity test devices 40, 50. Accordingly, the connector housing 11 can be used in common, which contributes to a decrease in mold costs.

The present disclosure is not limited to the above-described embodiment, and can be appropriately modified, improved, and the like. In addition, materials, shapes, dimensions, numbers, arrangement positions, and the like of respective components in the embodiment described above are freely selected and are not limited as long as the present disclosure can be implemented.

Here, features of the connector and the continuity test device according to the embodiment of the present disclosure described above are briefly summarized and listed in the following (i) to (iii).

(i) A connector (10, 20) including:
a connector housing (11) having a block portion (13) and a front holder insertion space (14) for inserting a front holder (30) that detects terminal half-insertion from a front side, the block portion (13) being provided with a terminal accommodating chamber (12), the front holder insertion space (14) being adjacent to the block portion (13), in which
the connector housing (11) is formed with, from a front end toward a rear side on a peripheral wall, a groove (16) for detecting erroneous fitting into a continuity test device (40, 50), and
when the front holder (30) is inserted into the front holder insertion space (14), the groove (16) for detecting erroneous fitting is fitted with a projection (36) provided on the front holder (30), and when the connector housing (11) is fitted into a fitting port (41) of a continuity test device (40) for a connector (10) without the front holder, the groove (16) receives a convex portion (46) provided on the fitting port (41) of the continuity test device (40).

According to the connector having the configuration of (i), in a case in which a continuity test device is prepared according to presence and absence of a front holder, even when a connector to which the front holder is attached is fitted into a continuity test device for a connector to which no front holder is attached or a connector to which no front holder is attached is fitted into a continuity test device for a connector to which the front holder is attached, the connector can be prevented from being fitted into the continuity test device, and thus trouble of erroneous fitting into a continuity test device can be avoided.

(ii) A continuity test device (40) that tests continuity of the connector (10) according to (i) in which no front holder (30) is attached to the connector housing (11), the continuity test device (40) including:
a fitting port (41) into which the connector housing (11) is fitted during the test; and
a convex portion (46) provided on the fitting port (41), in which
when the connector housing (11) without the front holder is fitted into the fitting port (41), the convex portion (46) is received by the groove (16) for detecting erroneous fitting and enables the fitting of the connector housing (11), and when the connector housing (11) with the front holder (30) is fitted, the convex portion (46) interferes with the projection (36) of the front holder (30) that blocks the groove (16) and disables the fitting of the connector housing (11).

According to the continuity test device having the configuration of (ii), even when a connector to which a front holder is attached is to be fitted despite that a connector to which no front holder is attached is to be tested for continuity, the connector can be prevented from being fitted, and thus trouble of erroneous fitting into a continuity test device can be avoided.

(iii) A continuity test device (50) that tests continuity of the connector (20) according to (i) in which the front holder (30) is attached to the connector housing (11), the continuity test device (50) including:
a fitting port (51) into which the connector housing (11) is fitted during the test; and
a front holder detector (52) provided on a back wall of the fitting port (51), in which
when the connector housing (11) with the front holder (30) is fitted into the fitting port (51), the front holder detector (52) detects presence of the front holder (30), and when the connector housing (11) without the front holder (30) is fitted, the front holder detector (52) detects absence of the front holder (30).

According to the continuity test device having the configuration of (iii), even when a connector to which no front holder is attached is to be fitted despite that a connector to which a front holder is attached is to be tested for continuity, a fact that no front holder is attached can be detected, and thus trouble of erroneous fitting into a continuity test device can be avoided.

What is claimed is:

1. A connector comprising:
a connector housing including:
a block portion being provided with a terminal accommodating chamber; and
a front holder insertion space being adjacent to the block portion for inserting a front holder that detects terminal half-insertion from a front side, wherein
the connector housing is formed with, from a front end toward a rear side on a peripheral wall, a groove for detecting erroneous fitting into a continuity test device,
the groove for detecting erroneous fitting is configured to be fitted with a projection provided on the front holder when the front holder is inserted into the front holder insertion space, and
the groove is configured to receive a convex portion provided on a fitting port of the continuity test device when the connector housing is fitted into the fitting port of a continuity test device for a connector without the front holder.

2. A continuity test device that tests continuity of the connector according to claim 1 in which no front holder is attached to the connector housing, the continuity test device comprising:
a fitting port into which the connector housing is configured to be fitted; and
a convex portion provided on the fitting port, wherein
when the connector housing without the front holder is fitted into the fitting port, the convex portion is configured to be received by the groove for detecting erroneous fitting so that the connector housing is fitted into the continuity test device, and
when the connector housing with the front holder is fitted, the convex portion is configured to come into contact with the projection of the front holder that blocks the groove so that the connector housing is blocked to be fitted into the continuity test device.

3. A continuity test device that tests continuity of the connector according to claim 1 in which the front holder is attached to the connector housing, the continuity test device comprising:
a fitting port into which the connector housing is configured to be fitted; and
a front holder detector provided on a back wall of the fitting port, wherein when the connector housing with the front holder is fitted into the fitting port, the front holder detector is configured to detect presence of the front holder, and when the connector housing without the front holder is fitted, the front holder detector is configured to detect absence of the front holder.

\* \* \* \* \*